US010554690B2

(12) United States Patent
DeLuca et al.

(10) Patent No.: US 10,554,690 B2
(45) Date of Patent: Feb. 4, 2020

(54) SECURITY POLICY INCLUSION WITH CONTAINER DEPLOYMENT (71) Applicant: International Business Machines Corporation, Armonk, NY (US)

(72) Inventors: Lisa Seacat DeLuca, Baltimore, MD (US); Nitin Gaur, Round Rock, TX (US); Dana L. Price, Surf City, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 15/348,890

(22) Filed: Nov. 10, 2016

(65) Prior Publication Data
US 2018/0131723 A1 May 10, 2018

(51) Int. Cl.
*G06F 21/00* (2013.01)
*H04L 29/06* (2006.01)

(52) U.S. Cl.
CPC ................... *H04L 63/20* (2013.01)

(58) Field of Classification Search
CPC ....................................................... H04L 63/20
See application file for complete search history.

(56) References Cited

U.S. PATENT DOCUMENTS

| 8,291,466 | B2 | 10/2012 | Hinton et al. |
| 9,276,963 | B2 | 3/2016 | Viswanathan et al. |
| 9,521,115 | B1 | 12/2016 | Woolward |
| 9,690,622 | B1* | 6/2017 | Argenti ................. G06F 9/5027 |
| 2014/0096270 | A1* | 4/2014 | Beckwith ............ G06F 21/6209 726/30 |
| 2014/0181894 | A1 | 6/2014 | Von Bokem et al. |
| 2014/0189777 | A1* | 7/2014 | Viswanathan ........ H04L 63/105 726/1 |
| 2015/0242629 | A1* | 8/2015 | Lindo ..................... G06F 21/53 726/1 |
| 2016/0162693 | A1 | 6/2016 | Breuer et al. |
| 2016/0216948 | A1* | 7/2016 | McPherson ............... G06F 8/71 |
| 2016/0301676 | A1 | 10/2016 | Gounares |
| 2016/0381075 | A1* | 12/2016 | Goyal ..................... H04L 63/20 713/176 |
| 2017/0054759 | A1* | 2/2017 | Lee ......................... H04L 63/20 |
| 2017/0093921 | A1 | 3/2017 | Duan |
| 2017/0116412 | A1* | 4/2017 | Stopel ................... G06F 21/577 |
| 2017/0249128 | A1* | 8/2017 | Fojtik ....................... G06F 8/71 |
| 2018/0004499 | A1* | 1/2018 | Ghosh .................. G06F 9/5083 |
| 2018/0129803 | A1* | 5/2018 | Levin ..................... G06F 21/52 |

(Continued)

FOREIGN PATENT DOCUMENTS

WO WO-2017041613 A1 * 3/2017 ............. G06F 9/445

OTHER PUBLICATIONS

"What is Docker?," Docker, Inc., 2016, 7 pages.

(Continued)

*Primary Examiner* — Kendall Dolly
(74) *Attorney, Agent, or Firm* — VanLeeuwen & VanLeeuwen; Christopher M. Pignato (57) ABSTRACT An approach is provided in which an information handling system creates a container that includes security information. The information handling system deploys the container to a container group and, in turn, performs a security-related action based on the security information.

17 Claims, 7 Drawing Sheets

(56) References Cited

U.S. PATENT DOCUMENTS

2018/0152534 A1* 5/2018 Kristiansson ........... H04L 67/16
2018/0196680 A1* 7/2018 Wang ...................... G06F 8/63

OTHER PUBLICATIONS

"Introduction to Container Security," Whitepaper, Docker, Mar. 2015, 8 pages.
"Red Hat Enterprise Linux Atomic Host 7 Container Security Guide," Red Hat Atomic Host Documentation Team, Red Hat, Inc., 2016, 21 pages.

* cited by examiner

Security Policies
305

- Protocol Security
- Shared Keys
- Certificate Authority
- Self-Signed Certificates
- Security Interception/Delegation Models
- Max Containers
- Optional/Required Service Dependencies

SECURITY POLICY INCLUSION WITH CONTAINER DEPLOYMENT

BACKGROUND

The present disclosure relates to managing container security related to orchestration, portability, and connection between containers deployed into a container group.

Container technology transforms an application into a lightweight, portable, self-sufficient unit that executes on a host system independent of the host system's installed operating system and applications. Containers provide an additional layer of protection that isolates a container from other containers and the host without using incremental resources of the underlying infrastructure. The nature of containers also facilitates a fast and easy application of patches and updates to the container's operating system, applications, and infrastructure layers, which help maintain overall security compliance. "Docker" is an example of container technology, which is an open platform to build, ship, and run distributed applications. Organizations utilize Docker to simplify and accelerate their application development and deployment process.

Microservices architecture involves the design of an application as a suite of independently deployable, small, modular services, which are typically referred to as "microservices." Each microservice executes a unique process and communicates through a well-defined, lightweight mechanism to serve a business goal using communication protocols. Microservices may be deployed on a wide variety of cloud environments provided by different service providers. Microservices architecture instills different requirements into how applications are developed, deployed and managed across their lifecycle.

BRIEF SUMMARY

According to one embodiment of the present disclosure, an approach is provided in which an information handling system creates a container that includes security information. The information handling system deploys the container to a container group and, in turn, performs a security-related action based on the security information.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
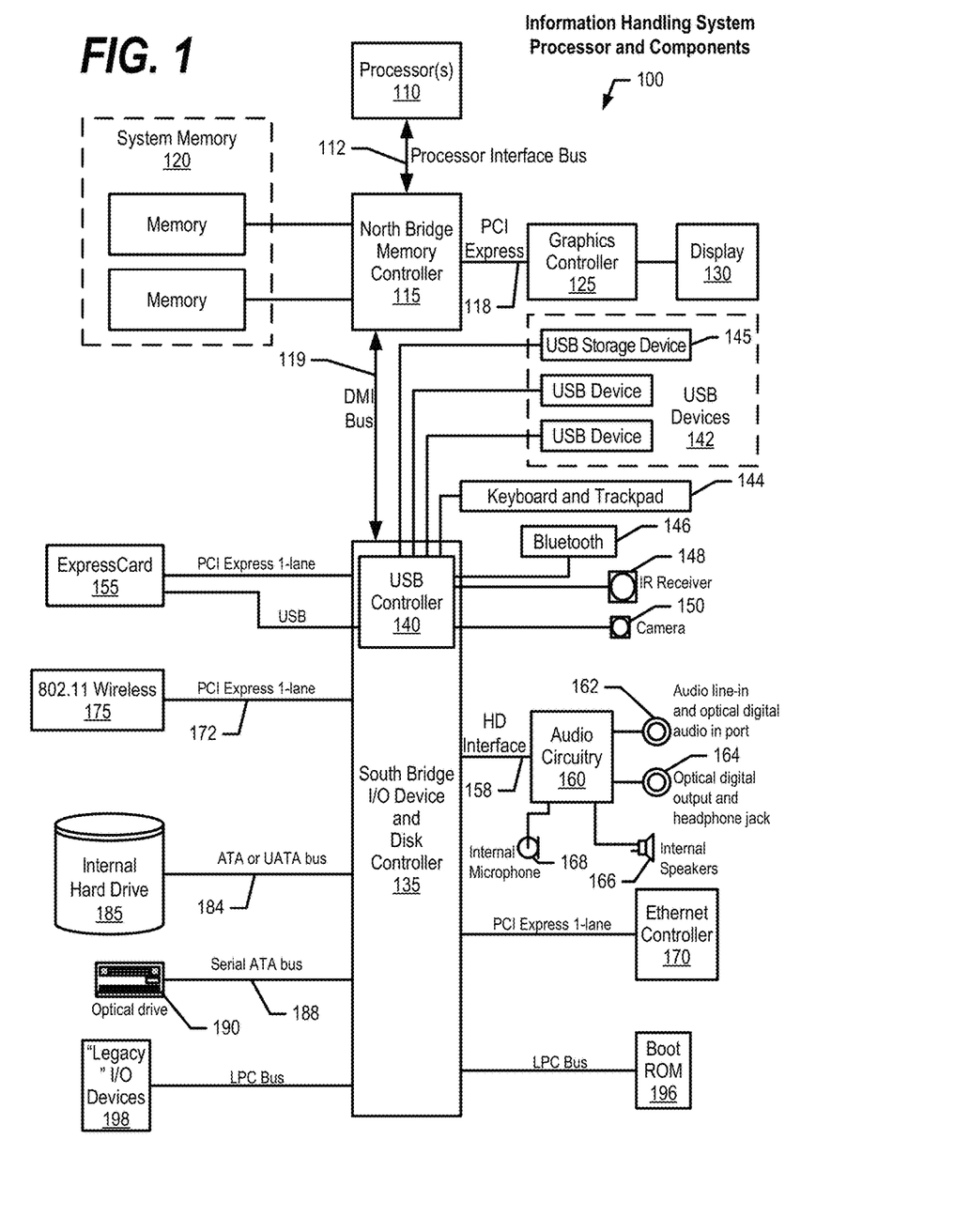
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
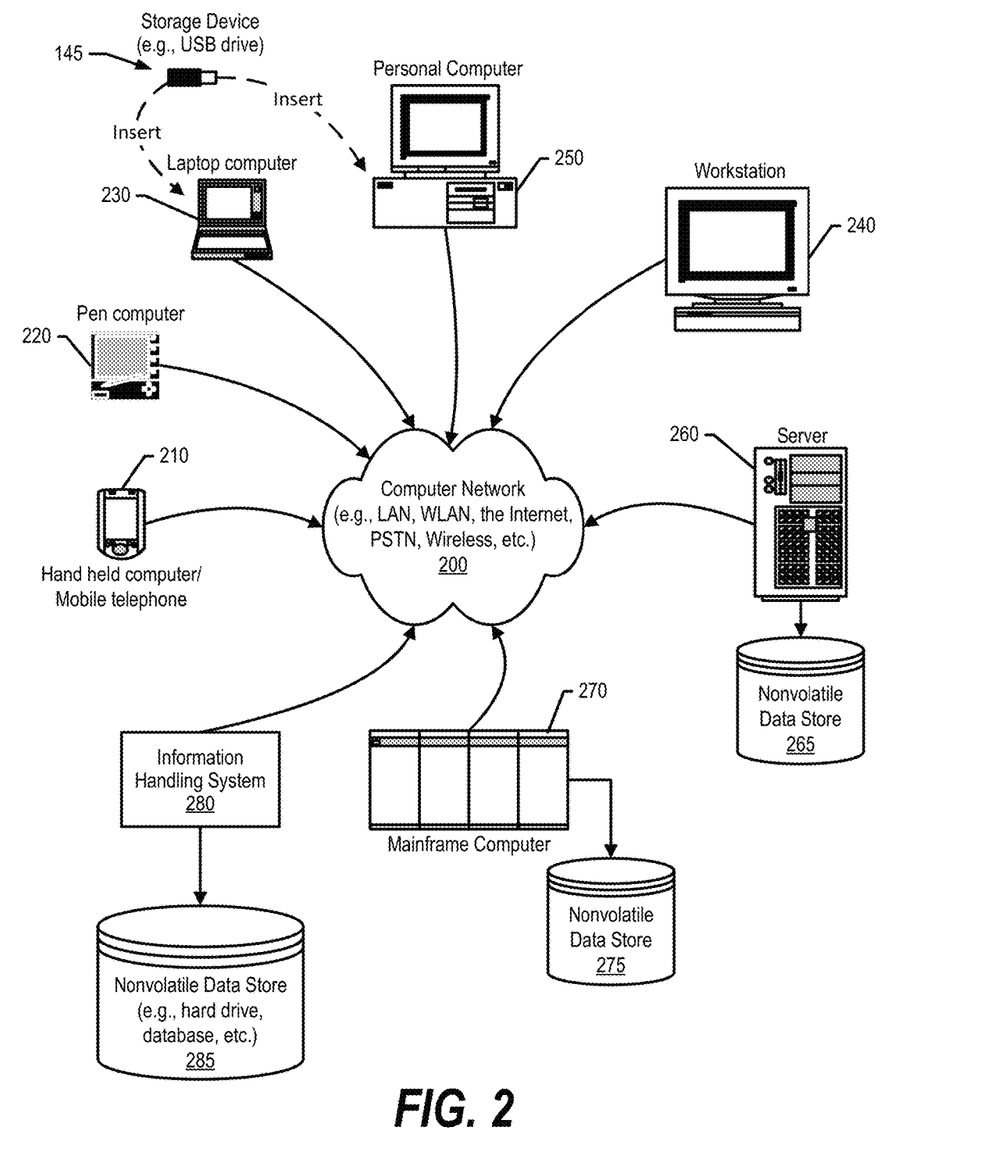
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 7 depict an approach that can be executed on an information handling system. As discussed earlier, while containers are lightweight, single deployable units, they also resolve dependencies and work in tandem with other micro services. Due to mass scaling of container deployments and their distributed and decoupled nature, the management and security of containers during deployment is challenging.

The information handling system discussed herein resolves these issues by integrating security information into the containers. In turn, the security information stays with the containers during deployment and throughout the containers' lifecycles. As defined herein, security information may be any information relating to the security of the container during deployment, and/or any information relating to the security of the container while executing. In one embodiment, the security information may be in the form of read-only service contracts but the security information may be in different forms other than those discussed herein.

The information handling system begins by building a security image, also referred to herein as a service-specific security image, from a container file (e.g., dockerfile), which includes pointers that point to service polices for inclusion into the build process. The service-specific security image registers with a HUB registry and service-specific security containers are deployed (launched) from the HUB registry into container groups. The container group's daemon includes a security helper process that interfaces to the HUB registry to ensure the service-specific security containers in the container group adhere to the security policies in their respective read-only security contracts.

Figure 3:
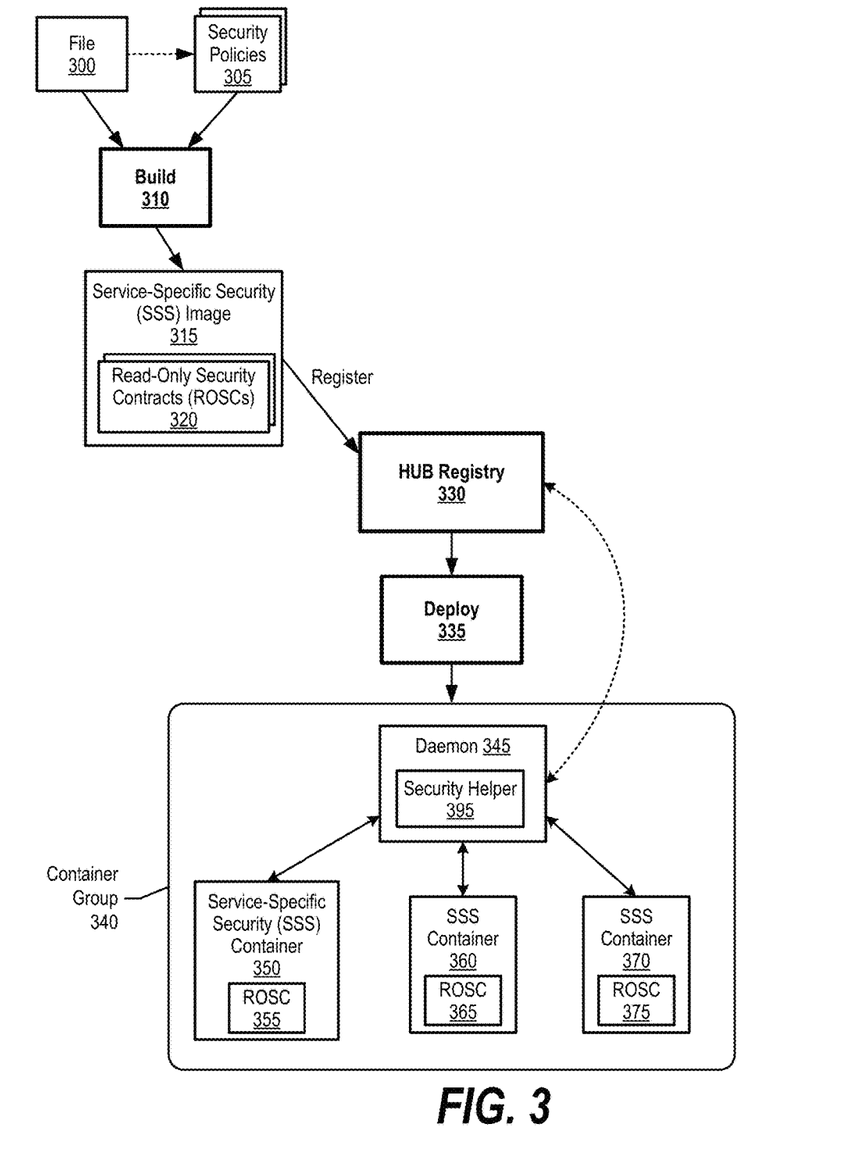
FIG. 3 is a high-level diagram showing an approach to generating service specific security containers that address security policy enforcement in massive container deployment that is agnostic of the their underlying infrastructure.

FIG. 3 is a high-level diagram showing an approach to generating service specific security containers that address security policy enforcement in massive container deployment that is agnostic of their underlying infrastructure. Security concepts such as shared key, security delegate and interception, etc. are managed using a new model of container deployment and management that incorporate security policies such as service/container association, instantiation limitations of number of containers, pre-negotiated set of shared keys for secure communication while establishing connection with other containers (e.g., microservices architecture), container execution dependent on being bound to one or more other services, and prevent portability (IC/IP Theft) by binding a container to an IaaS/Cloud infrastructure, which prevents theft of the containers but not losing their IP/IC value.

File 300 is a container file that, in one embodiment, is a text document that includes commands to build an image. File 300 includes references, or pointers, to security policies 305. Security policies 305 includes security information such as shared keys, certificate authorities, maximum number of containers, etc. During build process (build 310) the information handling system assesses file 300 and builds service-specific security image 315, which is a container image (e.g., docker container) that includes read-only security contracts (ROSCs) based on security policies 305. For example, security policies 305 may have a policy stating "Specific service will only use Service X of Version 1 as a dependent service for Function X and will use transport layer security (TLS) V2.0 only for communication security protocol," and read only security contracts 320 may have a line item of "requiredDependent Service: Service X; canUseMehod: Method X, Ver: 2, TransportProtocol: TLS, Ver:2." Service-specific security image 315 is a read-only layer from which service-specific security containers are launched (discussed below).

Service-specific security image 315 registers with HUB registry 330. In turn, service-specific security containers 350, 360, and 370 are instantiated from service-specific security image 315 and deployed (deploy 335) into container group 340 based on their corresponding read-only security contracts. In one embodiment, when HUB registry 330 receives a request to deploy a service-specific security container into container group 340, security helper 395 checks to ensure that the maximum number of service-specific security containers per the read-only security contracts have not been met. The example in FIG. 3 shows three service-specific security containers 350, 360, and 370 are deployed into container group 340 and each include their respective read-only security contracts 355, 365, and 375.

In one embodiment, read-only security contracts 320 indicates security helper services such as key generation, management, interception and delegation services etc. The shared key and certificate authority data is shared as a distributed data structure to service-specific security containers 350, 360, and 370 in container group 340. In another embodiment, generated service specific security containers may be shared across multiple container groups or dynamically generated per container group to keep the service specific security container unique (e.g., higher security) and ensure unique keys, certificates per container group, and isolation is maintained.

Figure 6:
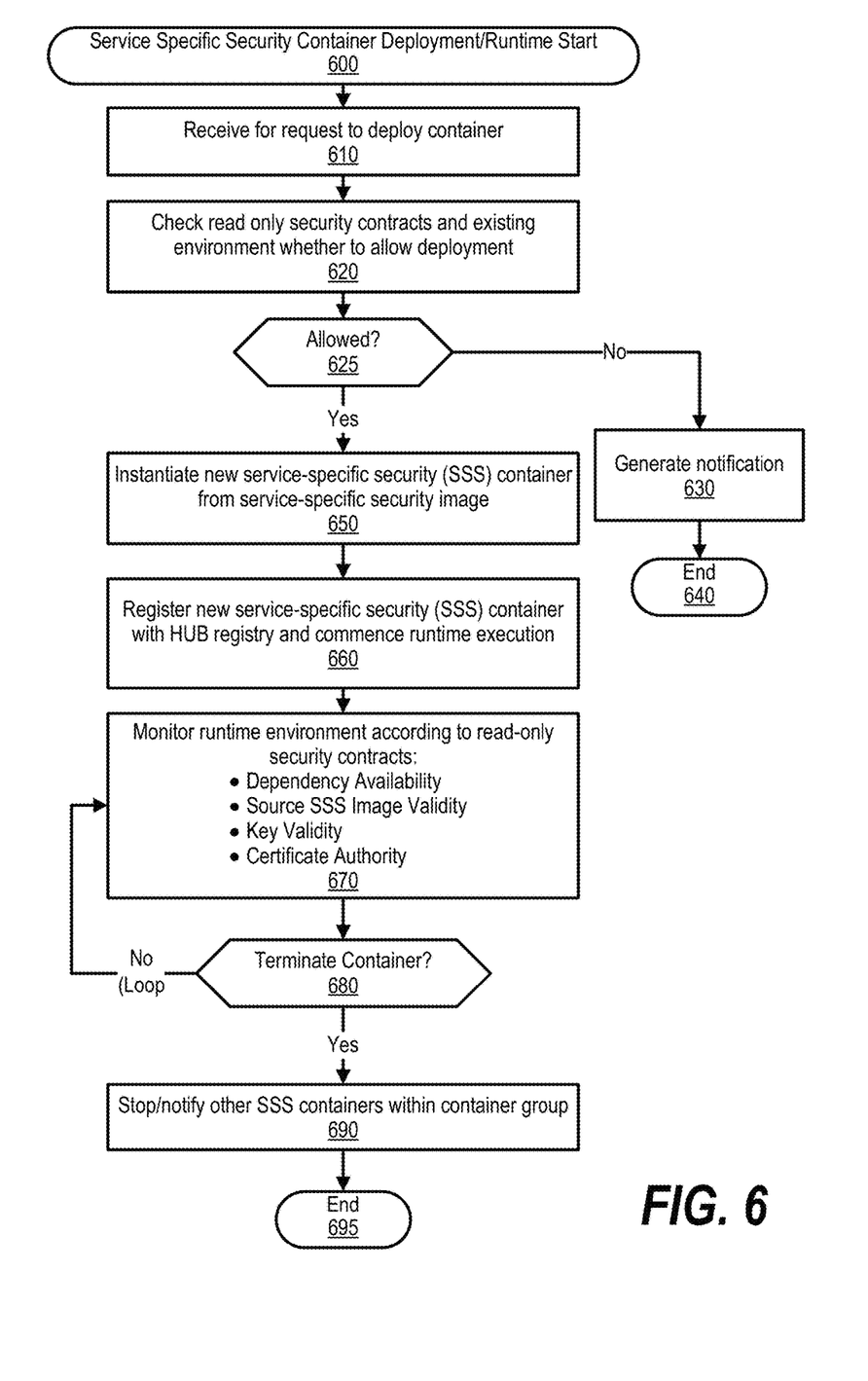
FIG. 6 depicts a flowchart showing steps taken to deploy and execute service-specific security containers from service-specific security images.

The service-specific security containers execute in runtime and, upon service termination and or membership change (critical service dependency), a service-specific security container terminates its own existence, which indicates an insecure container group and prompting an action from daemon 345 to stop effected containers in container group 340 and/or notify a system administrator (see FIG. 6 and corresponding text for further details). In addition, when the source service-specific security image (service-specific security image 315) de-registers from HUB registry 330, security helper 395 detects that the service-specific security container is de-registered and terminates the service-specific security containers in container group 340 accordingly (see FIG. 7 and corresponding text for further details).

Figure 4:
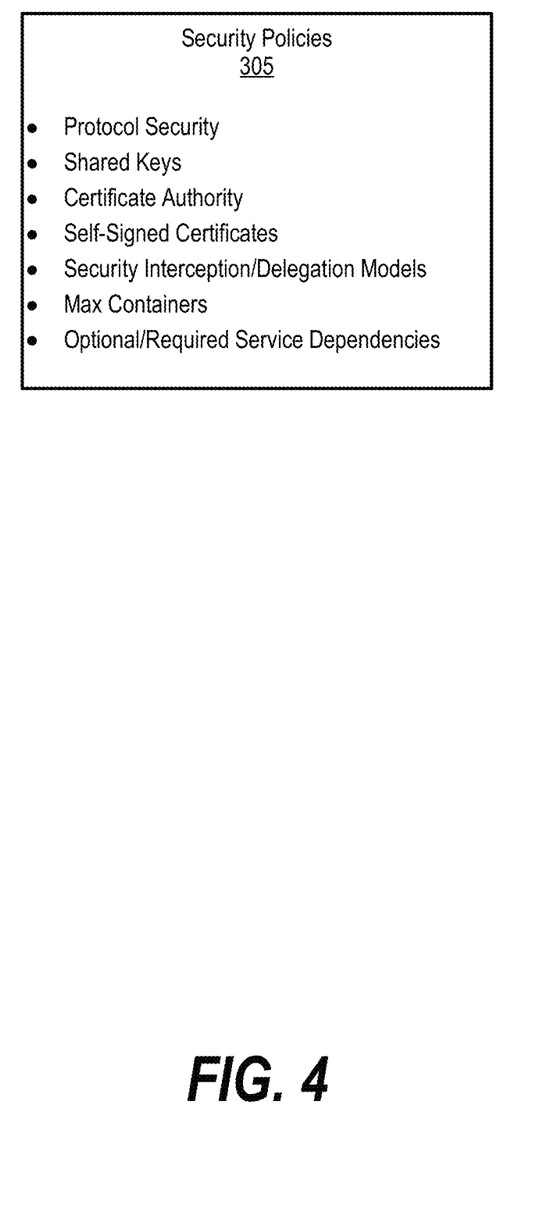
FIG. 4 is a diagram depicting an example of security policies that are built into a service-specific security image.

FIG. 4 is a diagram depicting an example of security policies that are built into a service-specific security image. As those skilled in the art can appreciate, security policies 305 may include more, less, or different policies than what is shown in FIG. 3 and discussed herein. Security policies 305 may include several security policies that are incorporated into each respective service-specific security container. Security policies may include:
   Protocol Security: Specifies protocol type/version;
   Shared Keys: Specifies cryptographic key information such as type and location;
   Certificate Authority: Specifies certificate authority information such as whether the certificate authority is self-signed or through a third party;
   Self-Signed Certificates: Specifies a self-signed certificate with a specific domain;
   Security Interception/Delegation Models: Specifies a model where interception is acceptable, such as to a proxy or security delegation to a different module;
   Maximum Containers: Specifies a maximum number of containers in a container group;
   Optional/Required Service Dependencies: Specifies a list of required or optional services. If list of required services are unavailable, implies that the service stays dormant or eventually the container group self-destructs.

Figure 5:
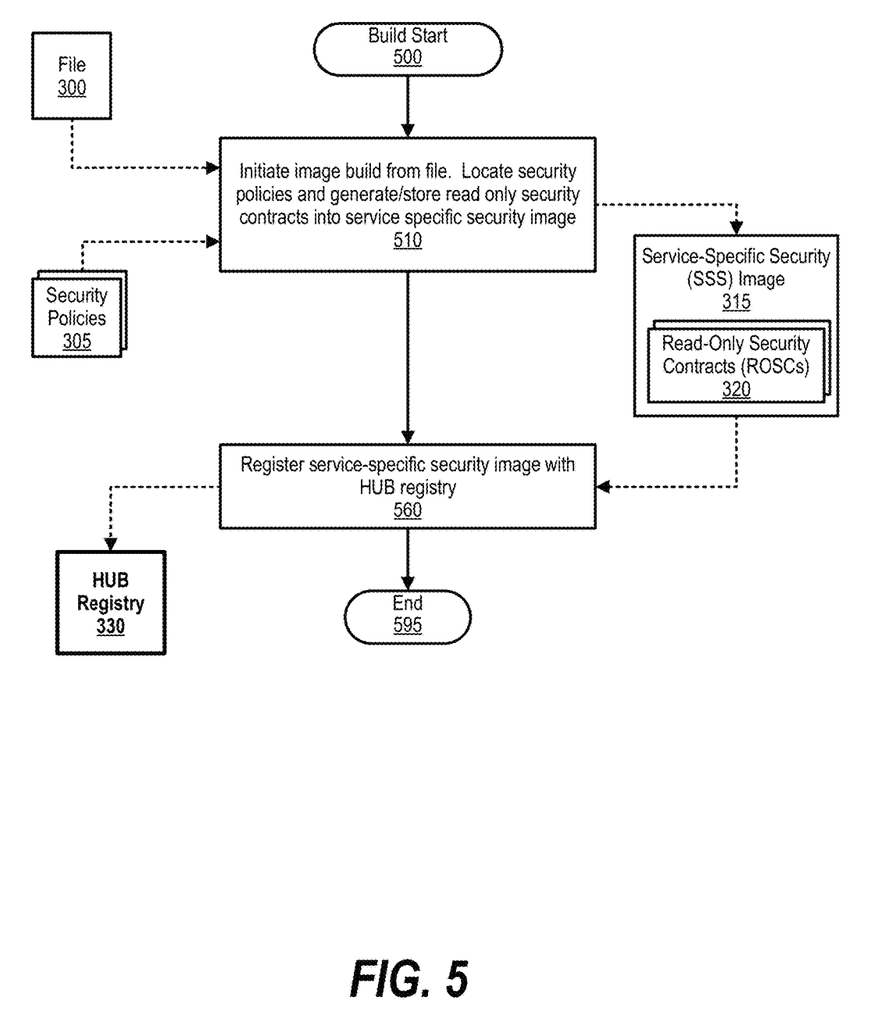
FIG. 5 depicts a flowchart showing steps taken to build a service-specific security image from a container file.

FIG. 5 depicts a flowchart showing steps taken to build a service-specific security image from a container file. FIG. 5 processing commences at 500 whereupon, at step 510, the process initiates a service-specific security image build from file 300. In one embodiment, file 300 is a dockerfile that is a text document containing commands to build an image, and some of the commands point to security policies 305. As such, the build results in service-specific security image 315, which includes read-only security contracts 320 that correspond to security policies 305.

At step 560, the process registers with HUB registry 330 that, in one embodiment, may be a docker HUB registry that provides hosting and delivery of images. At this point, users may request containers from HUB registry 330 that are launched from registered service-specific security image 315 (see FIG. 6 and corresponding text for further details). FIG. 5 processing thereafter ends at 595.

FIG. 6 depicts a flowchart showing steps taken to deploy and execute service-specific security containers from service-specific security images. FIG. 6 processing commences at 600 whereupon, at step 610, the process receives a request to deploy a container from service-specific security image 315. At step 620, the process checks read only security contracts and existing container group 340 conditions to determine whether to allow another deployment. For example, one of the read-only security contracts may indicate only 20 service-specific security containers should be deployed and, in this example, the process may be attempting to deploy a $21^{st}$ service-specific security container.

The process determines as to whether to allow a service-specific security container deployment (decision 625). If not, then decision 625 branches to the 'no' branch whereupon, at step 630, the process performs a security-related action, such as generating a notification to a system administrator. FIG. 6 processing thereafter ends at 640.

On the other hand, if the process allows another service-specific security container deployment, then decision 625 branches to the 'yes' branch. At step 650, the process instantiates a new service-specific security (SSS) container from service-specific security image. At step 660, the process registers the new service-specific security (SSS) container with HUB registry 330 and commences runtime execution.

At step 670, the process monitors runtime environment according to read-only security contracts taking factors into account such as:

Dependency Availability: Monitors dependent containers' validity;

Source service-specific security image validity: Monitors source service-specific security image for de-registration at HUB registry;

Key Validity: Specifies length of time that long keys are valid, which be a specific date or number of days since inception. Once key are invalid either new set of keys are distributed or the container group (or a member on behalf of group) renegotiates connection with new set of keys;

Certificate Authority: Certification authority from a third party entity or self-signed.

The process monitors the runtime environment relative to the security information in the security contracts and determines as to whether to perform a security-related action, such as terminating a container (decision 680). If the process should not terminate the container, then decision 680 branches to the 'no' branch which loops back to monitor the runtime environment. This looping continues until the process should terminate the service-specific security container, such as when the source service-specific security image de-registers from HUB registry 330, at which point decision 680 branches to the 'yes' branch exiting the loop. At step 690, the process stops/notifies the other service-specific security containers within the container group, and FIG. 6 processing thereafter ends at 695.

Figure 7:
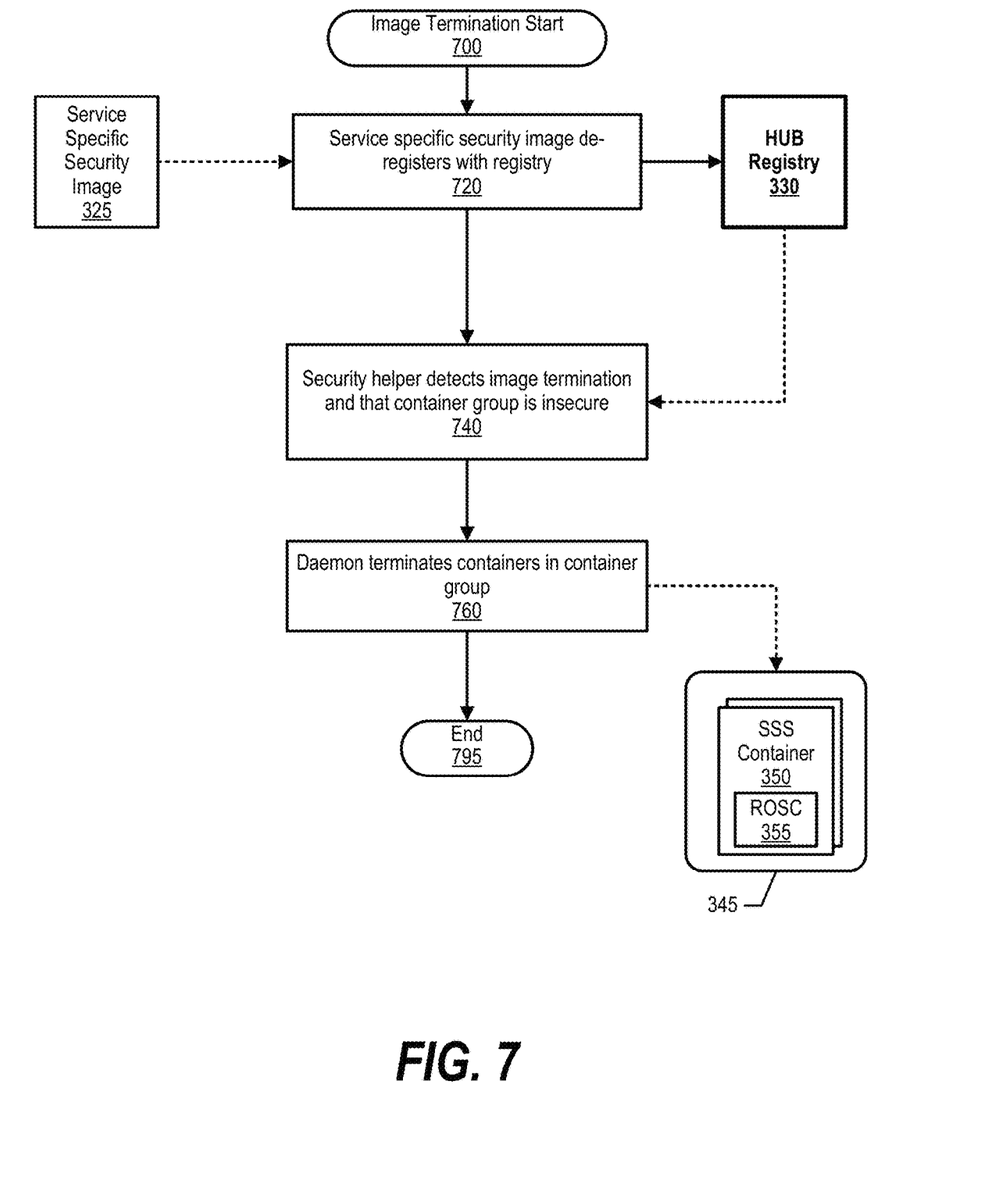
FIG. 7 depicts an exemplary flowchart showing steps taken to de-register a service-specific security image and terminate corresponding service-specific security containers.

FIG. 7 depicts an exemplary flowchart showing steps taken to de-register a service-specific security image and terminate corresponding service-specific security containers. FIG. 7 processing commences at 700 whereupon, at 720, the process de-registers service-specific security image 325 with registry 330. At step 740, security helper 395 detects the image de-registration from HUB registry 330 and determines that its corresponding container group 345 is now insecure. As such, at step 760, daemon 345 terminates the service-specific security containers in container group 345. In one embodiment, terminating the service-specific security containers may propagate to other service-specific security containers. For example, when a service-specific security container is terminated, other service-specific security containers that depend upon the terminated service-specific security container may be terminated as well. FIG. 7 processing thereafter ends at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
building a security image that includes one or more security contracts;
registering the security image with a registry;
creating a container from the registered security image that comprises security information corresponding to the one or more security contracts embedded in the container;
deploying the container to a container group over a distributed environment;
applying the security information to the container group, wherein the container group includes a plurality of containers including the container;
determining that at least a portion of the security information has been violated by at least one of the plurality of containers; and
performing a security-related action on each of the plurality of containers in response to the determination.

2. The method of claim 1 further comprising:
de-registering the security image from the registry subsequent to the deploying of the container; and
terminating the container in response to detecting that the security image is de-registered from the registry.

3. The method of claim 2 wherein the one or more security contracts are based on one or more security policies, and wherein at least one of the one or more security policies is selected from the group consisting of a protocol security policy, a shared key policy, a certificate authority policy, a self-signed certificate policy, a security interception/delegation model policy, a maximum containers policy, and a service dependencies policy.

4. The method of claim 1 wherein, based on the security information, the container is dependent upon a different container, the method further comprising:
determining that the different container is terminated; and
terminating the container in response to the determining that the different container is terminated.

5. The method of claim 1 further comprising:
determining that one of the plurality of containers is invalid based on the security information; and
terminating each of the plurality of containers in response to the determination that one of the plurality of security containers is invalid.

6. The method of claim 1 further comprising:
subsequent to the deploying of the container, receiving a request to deploy another container corresponding to the security image;
comparing a maximum container amount included in the security information against an amount of containers included in the container group; and
denying the request in response to determining that the amount of containers included in the container group has reached the maximum container amount.

7. An information handling system comprising:
one or more processors;
a memory coupled to at least one of the processors;
a set of computer program instructions stored in the memory and executed by at least one of the processors in order to perform actions of:
building a security image that includes one or more security contracts;
registering the security image with a registry;
creating a container from the registered security image that comprises security information corresponding to the one or more security contracts embedded in the container;
deploying the container to a container group over a distributed environment;
applying the security information to the container group, wherein the container group includes a plurality of containers including the container;
determining that at least a portion of the security information has been violated by at least one of the plurality of containers; and
performing a security-related action on each of the plurality of containers in response to the determination.

8. The information handling system of claim 7 wherein the processors perform additional actions comprising:
de-registering the security image from the registry subsequent to the deploying of the container; and
terminating the container in response to detecting that the security image is de-registered from the registry.

9. The information handling system of claim 8 wherein the container is created from the security image, and wherein the security information corresponds to the one or more security contracts.

10. The information handling system of claim 8 wherein the one or more security contracts are based on one or more security policies, and wherein at least one of the one or more security policies is selected from the group consisting of a protocol security policy, a shared key policy, a certificate authority policy, a self-signed certificate policy, a security interception/delegation model policy, a maximum containers policy, and a service dependencies policy.

11. The information handling system of claim 7 wherein, based on the security information, the container is dependent upon a different container, and wherein the processors perform additional actions comprising:
determining that the different container is terminated; and
terminating the container in response to the determining that the different container is terminated.

12. The information handling system of claim 7 wherein the processors perform additional actions comprising:
determining that one of the plurality of containers is invalid based on the security information; and
terminating each of the plurality of containers in response to the determination that one of the plurality of security containers is invalid.

13. The information handling system of claim 7 wherein the processors perform additional actions comprising:
subsequent to the deploying of the container, receiving a request to deploy another container corresponding to the security image;
comparing a maximum container amount included in the security information against an amount of containers included in the container group; and
denying the request in response to determining that the amount of containers included in the container group has reached the maximum container amount.

14. A computer program product stored in a computer readable storage medium, comprising computer program code that, when executed by an information handling system, causes the information handling system to perform actions comprising:
building a security image that includes one or more security contracts;
registering the security image with a registry;
creating a container from the registered security image that comprises security information corresponding to the one or more security contracts embedded in the container;
deploying the container to a container group over a distributed environment;
applying the security information to the container group, wherein the container group includes a plurality of containers including the container;
determining that at least a portion of the security information has been violated by at least one of the plurality of containers; and
performing a security-related action on each of the plurality of containers in response to the determination.

15. The computer program product of claim 14 wherein the information handling system performs further actions comprising:
de-registering the security image from the registry subsequent to the deploying of the container; and
terminating the container in response to detecting that the security image is de-registered from the registry.

16. The computer program product of claim 15 wherein:
the one or more security contracts are based on one or more security policies, and wherein at least one of the one or more security policies is selected from the group consisting of a protocol security policy, a shared key policy, a certificate authority policy, a self-signed certificate policy, a security interception/delegation model policy, a maximum containers policy, and a service dependencies policy.

17. The computer program product of claim 14 wherein the information handling system performs further actions comprising:
subsequent to the deploying of the container, receiving a request to deploy another container corresponding to the security image;
comparing a maximum container amount included in the security information against an amount of containers included in the container group; and
denying the request in response to determining that the amount of containers included in the container group has reached the maximum container amount.

\* \* \* \* \*